(12) United States Patent
Moriyama

(10) Patent No.: US 9,365,234 B2
(45) Date of Patent: Jun. 14, 2016

(54) TELESCOPIC STEERING APPARATUS

(71) Applicant: NSK LTD., Tokyo (JP)

(72) Inventor: Seiichi Moriyama, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/353,923

(22) PCT Filed: Aug. 22, 2013

(86) PCT No.: PCT/JP2013/072446
§ 371 (c)(1),
(2) Date: Apr. 24, 2014

(87) PCT Pub. No.: WO2014/030713
PCT Pub. Date: Feb. 27, 2014

(65) Prior Publication Data
US 2015/0151776 A1 Jun. 4, 2015

(30) Foreign Application Priority Data

Aug. 23, 2012 (JP) ................. 2012-184113

(51) Int. Cl.
B62D 1/18 (2006.01)
B62D 1/19 (2006.01)
(Continued)

(52) U.S. Cl.
CPC .............. *B62D 1/192* (2013.01); *B21D 26/033* (2013.01); *B62D 1/16* (2013.01); *B62D 1/184* (2013.01); *B62D 1/185* (2013.01); *B21D 53/88* (2013.01)

(58) Field of Classification Search
CPC ......... B62D 1/192; B62D 1/184; B62D 1/185

USPC ............................................ 280/777; 74/493
See application file for complete search history.

(56) References Cited

U.S. PATENT DOCUMENTS 4,693,136 A * 9/1987 Clerc ................... B62D 1/192
403/377
6,109,652 A * 8/2000 Kim ..................... B62D 1/192
280/777

(Continued)

FOREIGN PATENT DOCUMENTS

CN 1906076 A 1/2007
JP 3-128564 U 12/1991

(Continued)

OTHER PUBLICATIONS

Sato et al., Steering Column Device, Mar. 4, 2004, JPO, JP 2004-066925 A, Machine Translation of Description.*

(Continued)

*Primary Examiner* — James English
(74) *Attorney, Agent, or Firm* — Sughrue Mion, PLLC

(57) ABSTRACT

A telescopic steering apparatus includes a steering column having an outer column and an inner column. An inner peripheral surface of the outer column has a supporting portion that supports the inner column. An inner peripheral surface of the outer column further has a shock absorbing portion at a location shifted toward one side in an axial direction from an axial end face of the inner column, a diameter of an inscribed circle of the shock absorbing portion being smaller than an outer diameter of the inner column. The outer column, including the supporting portion and the shock absorbing portion, and a movable bracket are integrally formed by an expansion forming.

9 Claims, 15 Drawing Sheets

(51) Int. Cl.
   *B21D 26/033* (2011.01)
   *B62D 1/16* (2006.01)
   *B62D 1/184* (2006.01)
   *B62D 1/185* (2006.01)
   *B21D 53/88* (2006.01)

(56) References Cited

U.S. PATENT DOCUMENTS

| | | | | |
|---|---|---|---|---|
| 8,186,242 | B2* | 5/2012 | Uesaka | B62D 1/184 280/775 |
| 2005/0077716 | A1* | 4/2005 | Urista | F16F 7/125 280/777 |
| 2005/0087970 | A1* | 4/2005 | Ulintz | B62D 1/192 280/775 |
| 2006/0028010 | A1* | 2/2006 | Yamada | B62D 1/184 280/775 |
| 2007/0234838 | A1* | 10/2007 | Sadakata | F16F 7/125 74/492 |
| 2008/0000316 | A1* | 1/2008 | Kurokawa | B62D 1/185 74/493 |
| 2010/0031768 | A1* | 2/2010 | Oshita | B62D 1/195 74/492 |
| 2013/0006471 | A1* | 1/2013 | Kirmsze | B62D 1/192 701/36 |
| 2013/0160592 | A1* | 6/2013 | Shibazaki | B62D 1/16 74/492 |
| 2014/0210196 | A1* | 7/2014 | Moriyama | B62D 1/184 280/777 |

FOREIGN PATENT DOCUMENTS

| | | |
|---|---|---|
| JP | 6-65149 U | 9/1994 |
| JP | 2000-6821 A | 1/2000 |
| JP | 2000-211534 A | 8/2000 |
| JP | 2002-53048 A | 2/2002 |
| JP | 2004-009837 A | 1/2004 |
| JP | 2004-66925 A | 3/2004 |
| JP | 2005-219641 A | 8/2005 |
| JP | 2006-232103 A | 9/2006 |
| JP | 2006-255785 A | 9/2006 |
| JP | 2008-302751 A | 12/2008 |
| JP | 2011-105122 A | 6/2011 |
| JP | 2011-218941 A | 11/2011 |
| WO | 2012/105330 A1 | 8/2012 |
| WO | 2012-114812 A1 | 8/2012 |

OTHER PUBLICATIONS

Tono, Tilt Type Steering Device, Aug. 2, 2000, JPO, JP 2000-211534 A, Machine Translation of Description.*
International Search Report, dated Nov. 26, 2013, issued by the International Searching Authority in counterpart International Application No. PCT/JP2013/072446.
Written Opinion, dated Nov. 26, 2013, issued by the International Searching Authority in counterpart International Application No. PCT/JP2013/072446.
Office Action dated Jul. 27, 2015, issued by the State Intellectual Property Office of the People's Republic of China in counterpart Chinese Application No. 201380001901.6.
Communication dated Apr. 5, 2016 from the Japanese Patent Office in a counterpart Application No. 2012-184113.

* cited by examiner

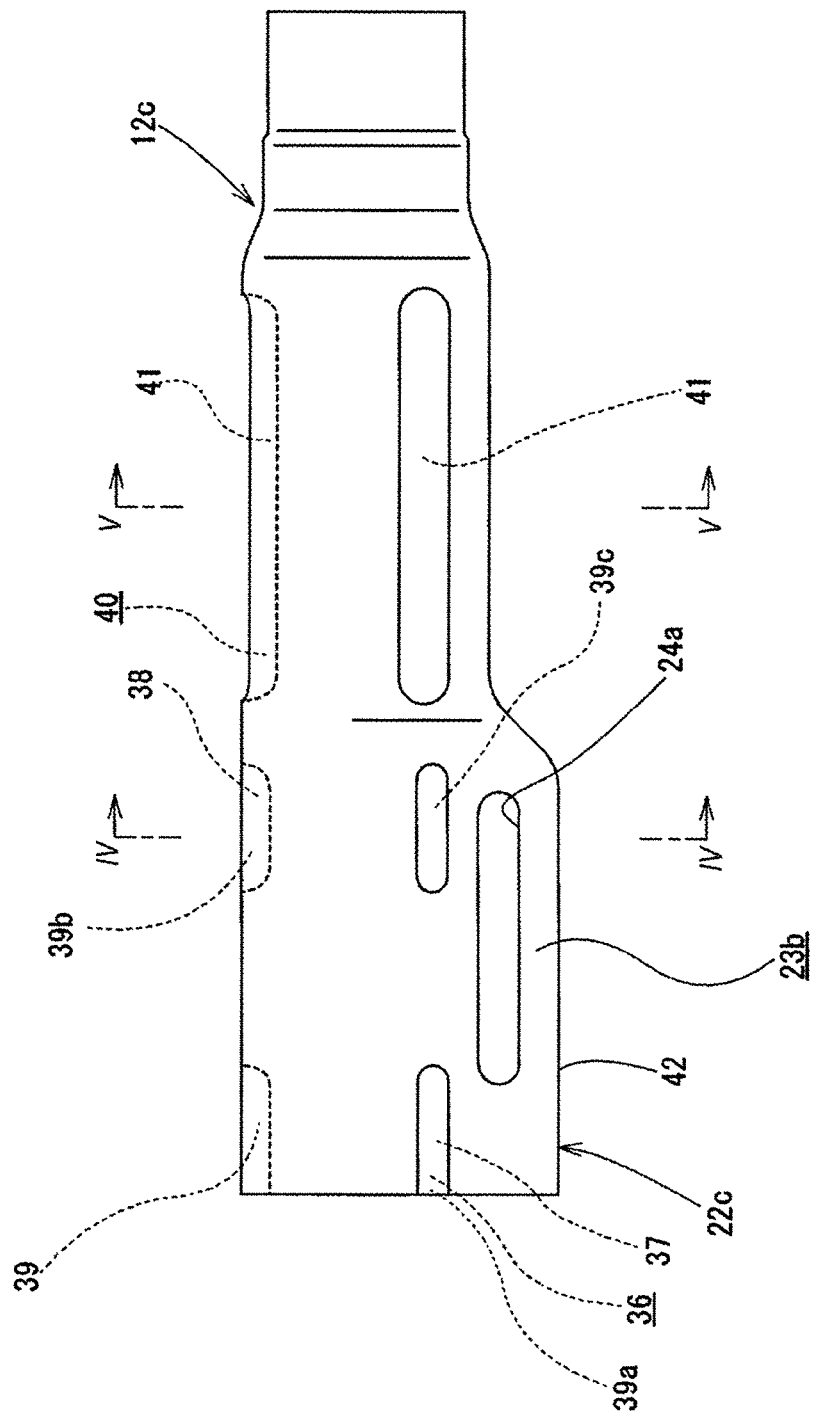

TELESCOPIC STEERING APPARATUS

TECHNICAL FIELD

The invention relates to a telescopic steering apparatus configured to adjust a front-rear position of a steering wheel.

BACKGROUND ART

FIGS. 11 and 12 illustrate a tilt-telescopic steering apparatus disclosed in Patent Document 1. The steering apparatus has a steering shaft 2 having a rear end portion to which a steering wheel 1 is fixed, a steering column 3 rotatably supporting the steering shaft 2 therein, a steering force assist device 5 which applies assist torque to the steering shaft 2 using an electric motor 4 as an auxiliary power source, and a steering gear unit 7 which pushes or pulls tie-rods 6, 6 in accordance with a rotation of the steering shaft 2. In this description, a front-rear direction means a front-rear direction of a vehicle.

The steering shaft 2 has an inner shaft 8 and an outer shaft 9. The inner shaft 8 and the outer shaft 9 are combined to transmit a rotational force and to be relatively displaced in an axial direction. A front end portion of the inner shaft 8 is connected to an input shaft of the steering force assist device 5 in a gear housing 10 of the steering force assist device 5. The steering column 3 has an inner column 11 and an outer column 12. A front end portion of the outer column 12 is fitted to a rear end portion outer side of the inner column 11 so that it can be relatively displaced in the axial direction. The inner column 11 is supported to a vehicle body 14 by a front fixed bracket 13 via the gear housing 10. The fixed bracket 13 swingably supports the gear housing 10 and the steering column 3 about a pivot pin 15. The front end portion of the outer column 12 is supported to the vehicle body 14 by a rear fixed bracket 17.

The fixed bracket 17 is supported to the vehicle body 14 so that it is forwards separated when a strong forward shock is applied. As shown in FIG. 12, the fixed bracket 17 has left and right side wall portions 18, 18 and support plate parts 19, 19 that are provided at upper end portions of the side wall portions 18, 18. Notches 20, 20 are provided for the support plate parts 19, 19 such that they are opened towards rear end edges of the support plate parts 19, 19. The notches 20, 20 are engaged with capsules 21, 21. The capsules 21, 21 are fixed to the vehicle body 14 by bolts (not shown).

Upon a collision accident, a high forward shock load is applied from a driver body to the steering column 3 via the steering wheel 1 and the steering shaft 2. The steering shaft 2 and the steering column 3 absorb this shock energy, and at the same time cause reduction in the entire length. As a result, the fixed bracket 17 is forwards displaced together with the outer column 12 and is thus forwards separated relative to the vehicle body 14, thereby permitting the steering wheel 1 to be forwards displaced.

In order to adjust front-rear and upper-lower positions of the steering wheel 1, the outer column 12 is supported to the fixed bracket 17 so that it can be moved in front-rear and upper-lower directions. A pair of clamped portions 23, 23 forming a movable bracket 22 is integrated with the outer column 12 on a lower surface of the front end portion of the outer column 12. Column side through-holes 24, 24 elongated in the front-rear direction are formed through the clamped portions 23, 23, respectively, at locations aligned with each other. Vehicle body side through-holes 25, 25 elongated in the upper-lower direction are formed through a portion of the side wall portions 18, 18 at locations aligned with each other. A rod member 26 is inserted into the column side through-holes 24, 24 and the vehicle-side through-holes 25, 25 from one side to the other side (from the right to the left in FIG. 12). An adjusting nut 28 is screwed to an end of the other side of the rod member 26 so that the clamped portions 23, 23 are held by the side wall portions 18, 18, and is configured so that it can be rotated by an adjusting lever 27.

Therefore, by rotating the adjusting nut 28 on the basis of an operation of the adjusting lever 27 to thus change an interval between the adjusting nut 28 and a head part 29 of the rod member 26, it is possible to fix the outer column 12 to the fixed bracket 17 or to release the outer column from the fixed bracket 17 and to fix the outer column 12 to the inner column 11 or to release the outer column from the inner column 11. In a state in which the interval between the adjusting nut 28 and the head part 29 is widened, it is possible to move the outer column 12 forwards and rearwards (to displace the outer column relative to the inner column 11) within a range (a telescopic adjusting range) in which the rod member 26 can be displaced in the respective column side through-holes 24, 24, thereby adjusting the front-rear position of the steering wheel 1. Furthermore, it is possible to move the steering column 3 upwards and downwards within a range (a tilt adjusting range) in which the rod member 26 can be displaced in the respective vehicle body side through-holes 25, 25, thereby adjusting the upper-lower position of the steering wheel 1. That is, at the state where the interval between the adjusting nut 28 and the head part 29 is widened, it is possible to adjust the front-rear and upper-lower positions of the steering wheel 1 within the ranges in which the rod member 26 can be displaced in the respective column side through-holes 24, 24 and the respective vehicle body side through-holes 25, 25.

A front end portion of an output shaft 16 of the steering force assist device 5 is coupled to a rear end portion of an intermediate shaft 31 via a universal joint 30. A front end portion of the intermediate shaft 31 is coupled to an input shaft 33 of the steering gear unit 7 via a separate universal joint 32. The tie-rods 6, 6 are pushed or pulled in connection with rotation of the input shaft 33, so that a desire steering angle is applied to the steering wheel.

When manufacturing the outer column 12 as described above, an outer column main body is first molded by a die-casting using a lightweight alloy such as aluminum alloy. Then, an inner peripheral surface of the outer column main body is subject to cutting work and is thus finished. For the steering apparatus, the cutting work for finishing an inner diameter of the outer column 12 with accuracy is troublesome and the processing cost is thus increased. Also, the inner peripheral surface of the outer column 12 and an outer peripheral surface of the inner column 11 are fitted over an entire circumference. Thus, when the inner diameter precision of the outer column 12 is not sufficient, a partial contact is caused, so that the inner column 11 cannot be stably maintained.

Thus, as shown in FIG. 13, Patent Document 2 discloses a telescopic steering apparatus in which protuberances 34, 34 protruding radially inward from an inner peripheral surface of an outer column are formed at a plurality of positions along a circumferential direction on the inner peripheral surface of the outer column 12a, and distal ends (radially inner end portions) of the respective protuberances 34, 34 contact an outer peripheral surface of an inner column 11a in an assembled state. When manufacturing the outer column 12a, an outer column main body is first molded by the die-casting. After that, forging and broaching are performed on a portion of an inner peripheral surface of the outer column main body overlapping the outer peripheral surface of the inner column 11a at a plurality of locations (eleven locations in the illustrated example) along a circumferential direction, thereby forming the respective protuberances 34, 34.

In the case of the outer column 12a as described above, the cutting work (the broaching and the like) is preferably performed only for the distal ends of the respective protuberances 34, 34. Therefore, compared to a configuration where the cutting work is performed for the entire inner peripheral surface of the outer column, it is possible to reduce the processing cost. However, the method of forming the outer column 12a and the method of the protuberances 34, 34 are different from each other. Hence, it takes much time to perform the processing and the processing cost is thus increased. Also, in order to stably support the inner column 11a radially inside the outer column 12a without partial contact or play, the contacting conditions of all the protuberances 34, 34 and the outer peripheral surface of the inner column 11a are preferably the same. However, when the multiple protuberances 34, 34 are provided, like the outer column 12a, the process for making the contacting conditions be the same is troublesome.

FIG. 14 shows another outer column 12b disclosed in Patent Document 2. An inner peripheral surface of the outer column 12b is formed with support pawls 35, 35 at three circumferential positions facing an outer peripheral surface of an inner column 11b in an assembled state. The respective support pawls 35, 35 are formed by performing press processing for the outer column 12b and further bending processing from the inner peripheral surface of the outer column 12b radially inwards. The outer peripheral surface of the outer column 12b is provided with a movable bracket 22a at a part thereof in an axial direction. The movable bracket 22a has left and right clamped portions 23a, 23a. Each of the clamped portions 23a, 23a is formed by bending a plate-shaped material and has one end continuing from the outer peripheral surface of the outer column 12b and the other end welded to the outer peripheral surface of the outer column 12b.

In the case of the outer column 12b, the support pawls 35, 35 are formed at the three positions that are spaced at a substantially equal interval in the circumferential direction. Therefore, it is possible to easily perform the process for making the contacting conditions of distal ends of all the support pawls 35, 35 and the outer peripheral surface of the inner column 11b be the same. However, each of the support pawls 35, 35 has a cantilever-shaped structure where it is bent radially inwards from the inner peripheral surface of the outer column 12b. Hence, it is difficult to secure the stiffness for stably supporting the inner column 11b radially inside the outer column 12b. Also, the operation of welding the other end of the clamped portions 23a, 23a to the outer column 12b consumes much time, which increases the processing cost.

Patent Documents 1, 3 and 4 disclose a structure where an energy absorption member for absorbing a shock load by plastic deformation is provided between a steering column (or a member fixed to the steering column) and a vehicle body (or a member fixed to the vehicle body) so as to alleviate shock, which is applied to a driver body upon a secondary collision, and to thus protect the driver, in addition to a structure of supporting the steering column to the vehicle body so that it can be forwards separated. According to the structure of the related art, since the separate energy absorption member is provided, the component manufacturing, the component management and the assembling operation are troublesome, which increases the cost. Patent Document 5 discloses a technology of perforating a column during hydro forming process.

PRIOR ART DOCUMENTS

Patent Documents

Patent Document 1: JP 2011-218941 A
Patent Document 2: JP 2008-302751 A
Patent Document 3: JP 2005-219641 A
Patent Document 4: JP 2000-6821 A
Patent Document 5: JP 2006-255785 A

SUMMARY OF INVENTION

Problems to be Solved by Invention

An object of the invention is to provide a telescopic steering apparatus having a structure capable of stably maintaining an inner column radially inside an outer column and absorbing a shock load upon a collision at low cost.

Means for Solving the Problem

According to an aspect of the invention, a telescopic steering apparatus includes a telescopic steering column, a steering shaft, a fixed bracket configured to be fixed to a vehicle body, a movable bracket, a rod member, and an adjusting lever. The steering column is configured such that an outer column and an inner column are telescopically combined. The outer column has a cylinder shape, an inner diameter of at least a portion of which in an axial direction is enlargeable and reducible, and has a supporting portion configured to support the inner column on an inner peripheral surface thereof. The inner column is arranged radially inside the outer column, and is fitted and supported by the supporting portion of the outer column in an axially displaceable manner. The steering shaft is rotatably supported radially inside the steering column and has a rear end portion protruding rearward from a rear end opening of the steering column and is configured such that a steering wheel is attached thereto. The fixed bracket has a pair of side wall portions provided at a fixed part so as to hold the portion of the outer column having the enlargeable and reducible inner diameter from both sides in a width direction, the pair of side wall portions being displaceable toward and away from each other in the width direction. The movable bracket has a pair of clamped portion that is formed integrally with the outer column by plastic forming, the pair of clamped portions being displaceable toward and away from each other in the width direction in accordance with a displacement of the pair of side wall portions toward and away from each other in the width direction. The rod member is arranged in the width direction such that the rod member is inserted into vehicle body side throughholes formed through the pair of side wall portions at locations aligned with each other and column side through-holes formed through the pair of clamped portions. The rod member widens or to narrows a gap between a pair of surfaces of the pair of side wall portions opposed to each other in accordance with a rotation of the adjusting lever. The adjusting lever is provided at a base end portion of the rod member to widen or to narrow the gap between the pair of surfaces by its rotation.

An inner peripheral surface of the outer column has a shock absorbing portion at a location shifted toward one side in the axial direction from an axial end face of the inner column (on an advancing side of the inner column when the inner column and the outer column are relatively displaced in a compressing direction). A diameter of an inscribed circle of the shock absorbing portion is smaller than an outer diameter of the inner column. The outer column, including the supporting portion and the shock absorbing portion, is formed by expanding a hollow pipe radially outwards. The movable bracket is formed integrally with the outer column by an expansion forming.

The expansion forming is, for example, a hydroforming. The other examples of the expansion forming include a press working, a bulge forming, a vacuum forming, an air-blow forming and an explosive forming. The supporting portion of the outer column and the outer peripheral surface of the inner column may contact each other at three or more locations along a circumferential direction. For example, the supporting portion of the outer column and the outer peripheral surface of the inner column may contact each other at only three locations in the circumferential direction.

The supporting portion of the outer column may be finished by a cutting or a pressing. The shock absorbing portion may have protuberances that protrude radially inwards from the inner peripheral surface of the outer column at a plurality of locations along the circumferential direction on the inner peripheral surface of the outer column.

The supporting portion and the shock absorbing portion may be aligned in phase with respect to a circumferential direction. The supporting portion and the shock absorbing portion may be provided continuously in the axial direction. The shock absorbing portion may be provided at a location that is symmetric to the supporting portion with respect to a virtual plane including a central axis of an inscribed circle of the supporting portion and perpendicular to the pair of side wall portions of the fixed bracket.

Advantage of Invention

According to the one aspect of the invention, it is possible to provide the telescopic steering apparatus having the structure capable of stably maintaining the inner column radially inside the outer column and absorbing a shock load upon a secondary collision at low cost. First, the reason why the structure capable of stably maintaining the inner column radially inside the outer column can be implemented at low cost is because the outer column, including the supporting portion for supporting the inner column, and the movable bracket are integrally formed by an expansion forming such as a hydroforming for example. That is, even when the supporting portion has multiple (e.g., three or more) protuberances, it is possible to reduce the processing cost and to obtain the supporting portion having the high stiffness.

The reason why the structure capable of absorbing the shock load upon secondary collision cam be implemented at low cost is because the inner peripheral surface of the outer column is provided with the shock absorbing portion, the diameter of the inscribed circle of which is smaller than the outer diameter of the inner column, at the location shifted toward one side in the axial direction from the axial end face of the inner column, and the shock absorbing portion is formed by the expansion forming such as the hydroforming for example. That is, upon secondary collision, the inner column and the outer column are relatively displaced in a compressing direction such that the axial end face of the inner column frictionally moves along the shock absorbing portion of the outer column. The shock absorbing portion functions as a resistance against the compression of the inner column and the outer column and thus absorbs the shock energy applied to the steering wheel upon the secondary collision, thereby alleviating the shock applied to the driver body colliding with the steering wheel. Since the shock absorbing portion is directly formed at the outer column by the expansion forming, it is not necessary to provide a separate shock absorption member. As a result, it is possible to reduce the processing cost, the component management cost and the assembling cost.

When the supporting portion provided on the inner peripheral surface of the outer column and the outer peripheral surface of the inner column overlapping the supporting portion are configured to contact each other at only three locations along the circumferential direction, it is possible to enable the supporting portion to reliably contact the outer peripheral surface of the inner column. Also, since the number of the contacting locations is just three, it is possible to easily perform the process for making the contacting conditions the same for all the contacting locations.

When the supporting portion of the outer column is finished by cutting or pressing, it is possible to more stabilize the contacting condition of the supporting portion and the outer peripheral surface of the inner column. When the supporting portion has multiple protuberances, it is possible to reduce the processing cost and to stably support the inner column by the supporting portion, compared to a configuration where the cutting work is performed for an entire circumference of an inner peripheral surface of an outer column having a simple cylindrical shape.

When the shock absorbing portion has the protuberances that protrude radially inwards from the inner peripheral surface of the outer column at a plurality of locations along a circumferential direction on the inner peripheral surface of the outer column, it is possible to prevent the inner column from being inclined relative to the outer column, based on the load of the complex directions applied to the inner column and the outer column upon the compression of the inner column and the outer column, and to secure the stable energy absorption performance. Furthermore, it is possible to adjust the energy absorption performance by adjusting the number of the protuberances.

When the supporting portion and the shock absorbing portion are aligned in phase with respect to the circumferential direction, it is possible to easily configure that the supporting portion and the shock absorbing portion are continuous in the axial direction. When the supporting portion and the shock absorbing portion are made to be continuous in the axial direction, the inner column and the outer column can be smoothly (continuously) and stably compressed upon the secondary collision. As a result, it is possible to stably absorb the shock load upon secondary collision.

When the shock absorbing portion is provided at location that is symmetric to the supporting portion with respect to a virtual plane including the central axis of the inscribed circle of the supporting portion and perpendicular to the pair of side wall portions of the fixed bracket, it is possible to increase the contacting locations along the circumferential direction between the supporting portion and shock absorbing portion of the outer column and the outer peripheral surface of the inner column and to make the contacting locations be horizontally and vertically symmetric, when the inner column and the outer column are compressed and thus an axial end face of the inner column frictionally moves along the shock absorbing portion (in a state in which the shock load is absorbed). As a result, it is possible to more securely prevent the relative inclination of the inner column and the outer column, based on the load of the complex directions applied to the inner column and the outer column upon the secondary collision.

BRIEF DESCRIPTION OF THE DRAWINGS

FIG. 2 is a side view of an outer column of the steering column.

EMBODIMENTS OF INVENTION

Figure 11:
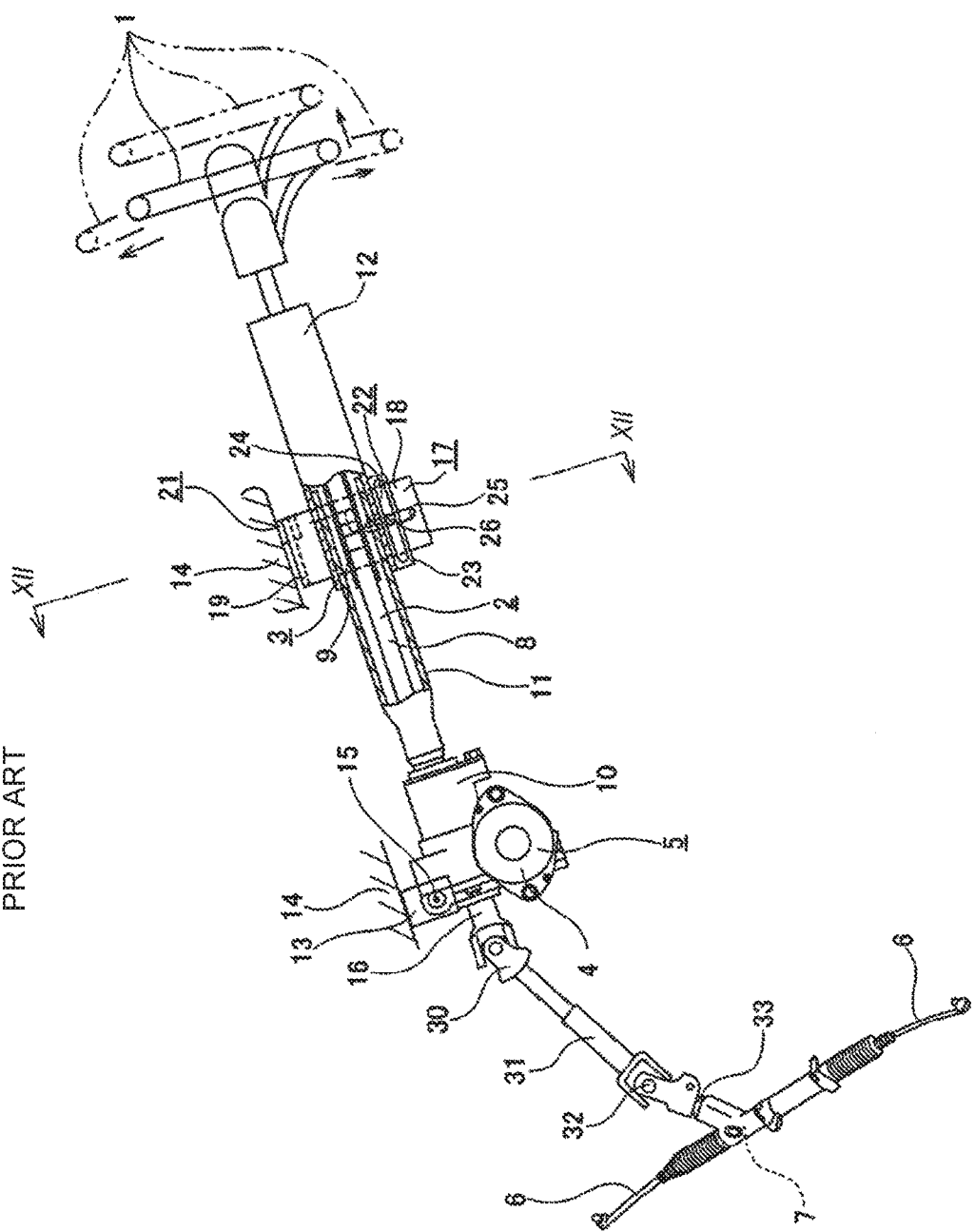
FIG. 11 is a partially cut side view illustrating an example of a vehicle steering apparatus having a telescopic steering apparatus mounted thereto.
Figure 12:
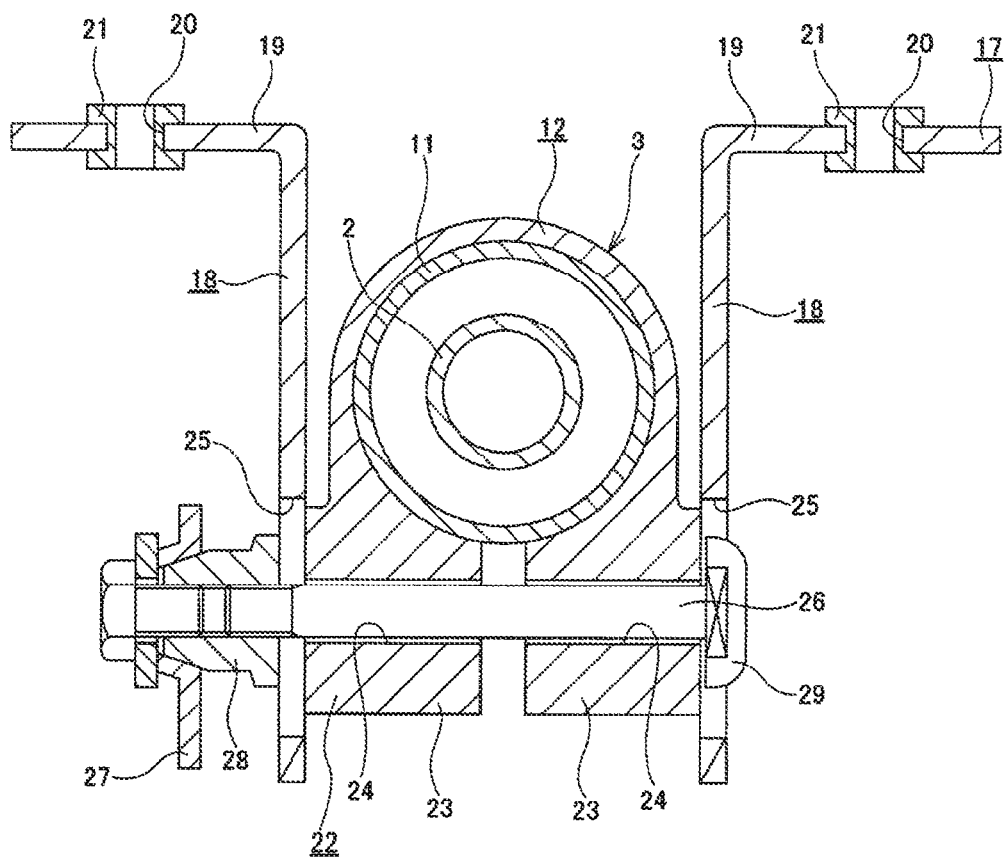
FIG. 12 is a sectional view of a telescopic steering apparatus according to a first conventional example, taken along the line XII-XII of FIG. 11.
Figure 13:
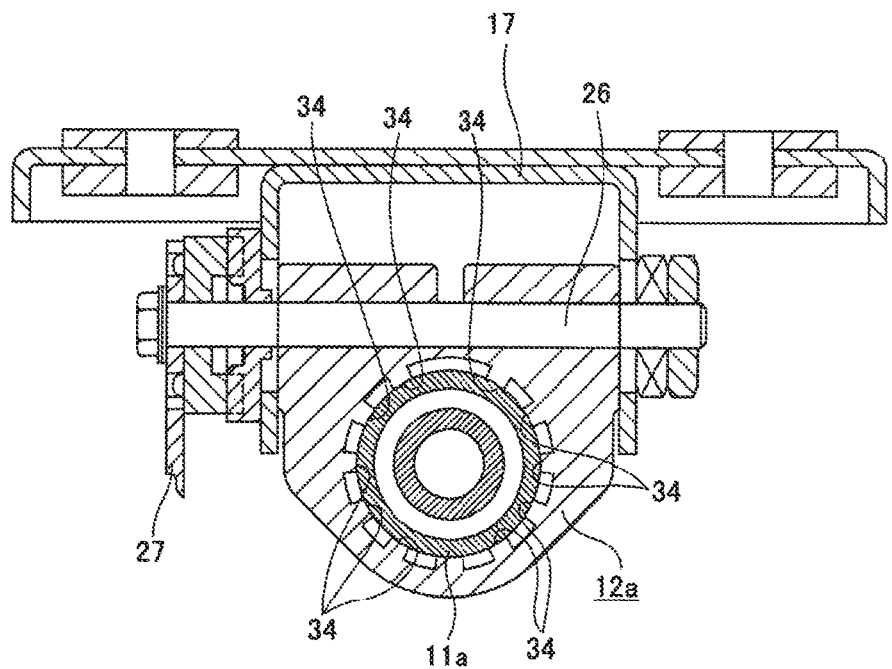
FIG. 13 is a sectional view of a telescopic steering apparatus according to a second conventional example.

FIGS. 1 to 5 show a telescopic steering apparatus according to a first embodiment of the invention. The telescopic steering apparatus has a telescopic mechanism configured to adjust a front-rear position of a steering wheel 1 (see FIG. 11) and a tilt mechanism configured to adjust an upper-lower position of the steering wheel 1, like the structure shown in FIGS. 11 and 12. However, the invention is also applicable to a structure having no tilt mechanism. A method of operating the telescopic steering apparatus is similar to that of the telescopic steering apparatus of the related art shown in FIGS. 11 and 12. The illustrations and descriptions of parts similar to those of the related art are omitted or simplified.

A steering column 3a of the telescopic steering apparatus of this embodiment has an outer column 12c configured as an upper column of the steering wheel 1-side (see FIG. 11) and an inner column 11c configured as a lower column of a side distant from the steering wheel 1.

A front end portion of the outer column 12c has a cylindrical shape and has an elastically enlargeable and reducible inner diameter, and has a supporting portion 36 for fitting and supporting the inner column 11c radially inside the outer column 12c in an axially displaceable manner. The supporting portion 36 has a front supporting portion 37 and a rear supporting portion 38. The front supporting portion 37 and the rear supporting portion 38 are provided at locations at which they can contact an outer peripheral surface of the inner column 11c even when an axial range in which the outer column 12c and the inner column 11c radially overlap each other is the shortest (in a state where the entire length of the steering column 3a is maximally extended).

The front supporting portion 37 has a plurality of protuberances 39, 39a formed on an inner peripheral surface of the outer column 12c. The respective protuberances 39, 39a are formed at three positions circumferentially equally spaced on the inner peripheral surface of the outer column 12c, along an axially overlapping range from the front end portion of the outer column 12c to a portion near front ends of column side through-holes 24a, 24a of a movable bracket 22c such that they protrude radially inwards from the inner peripheral surface of the outer column 12c. Distal ends (radially inner ends) of the respective protuberances 39, 39a are configured to contact the outer peripheral surface of the inner column 11c.

In order to enable the distal ends of the respective protuberances 39, 39a to reliably contact the outer peripheral surface of the inner column 11c without increasing the processing accuracy of the respective protuberances 39, 39a, the number of the protuberances 39, 39a is preferably three. However, after considering a balance such as processing cost and the like, the number of the protuberances 39, 39a may be larger than three (for example, a total of four, two by two at left and right sides). The positions at which the protuberances 39, 39a are formed are not limited to the positions circumferentially equally spaced on the inner peripheral surface of the outer column 12c. However, the protuberances 39, 39a are arranged to be distributed over a range exceeding, a semicircle without having a partiality for the semicircle.

Likewise, the rear supporting portion 38 has a plurality of protuberances 39b, 39c that is formed on the inner peripheral surface of the outer column 12c. The respective protuberances 39b, 39c are formed at three positions circumferentially equally spaced on the inner peripheral surface of the outer column 12c, along an axially overlapping range from a portion near rear ends of the column side through-holes 24a, 24a of the movable bracket 22c to a location shifted slightly rearwards from the rear end portions of the column side through-holes 24a such that they protrude radially inwards from the inner peripheral surface of the outer column 12c. In this example, a portion between the front supporting portion 37 and the rear supporting portion 38 of the inner peripheral surface of the outer column 12c in the axial direction does not contact the outer peripheral surface of the inner column 11c. However, the supporting portions may be formed to be continuous (the front supporting portion and the rear supporting portion are continuously connected) in the axial direction.

Figure 1A:
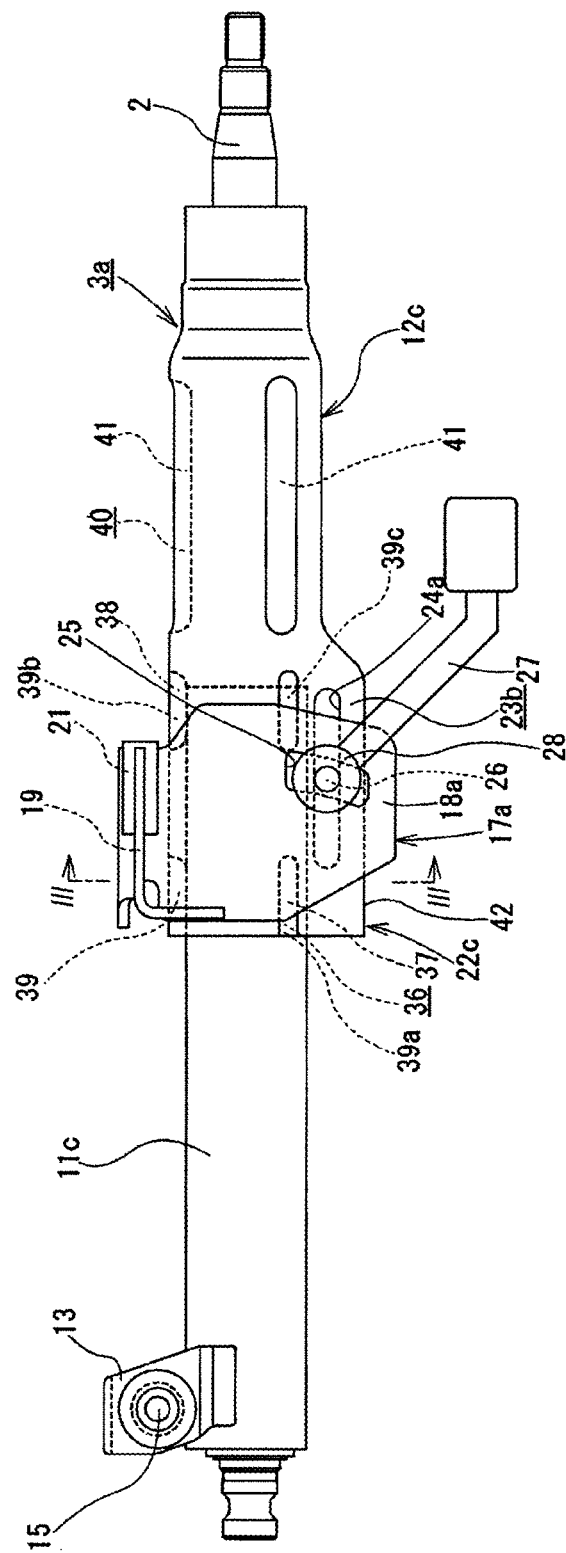
FIG. 1A is a side view of a telescopic steering apparatus according to a first embodiment of the invention, illustrating a state in which a steering column is not compressed.
Figure 1B:
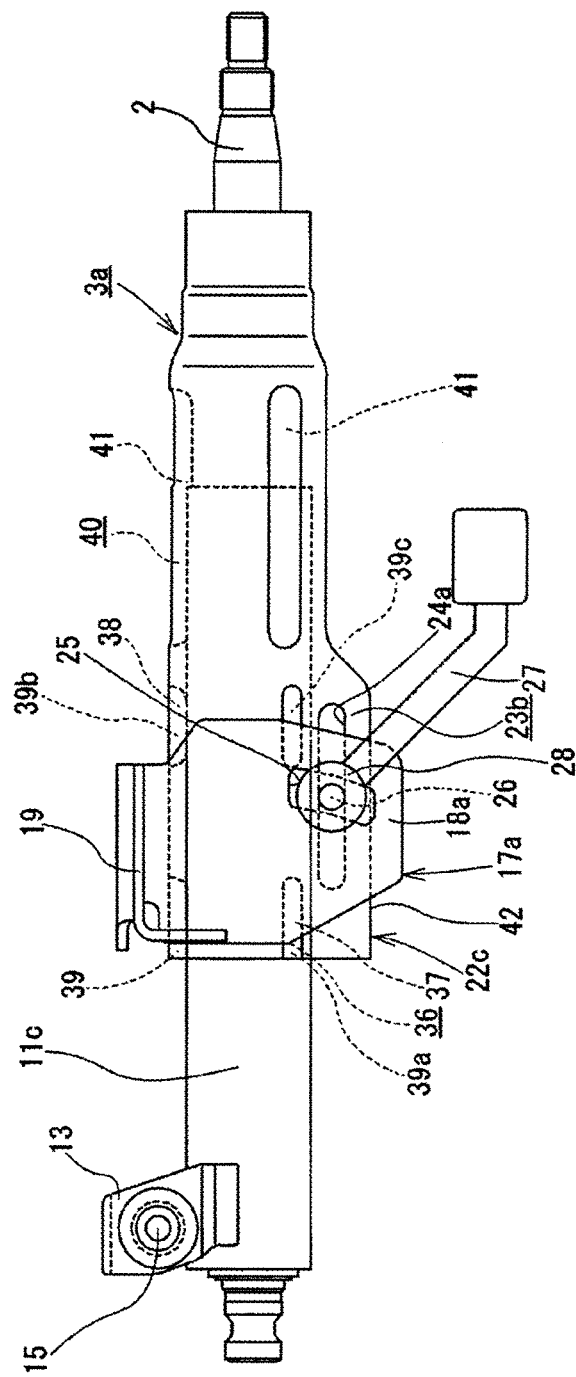
FIG. 1B is a side view of the telescopic steering apparatus, illustrating a state in which the steering column is compressed.
Figure 3:
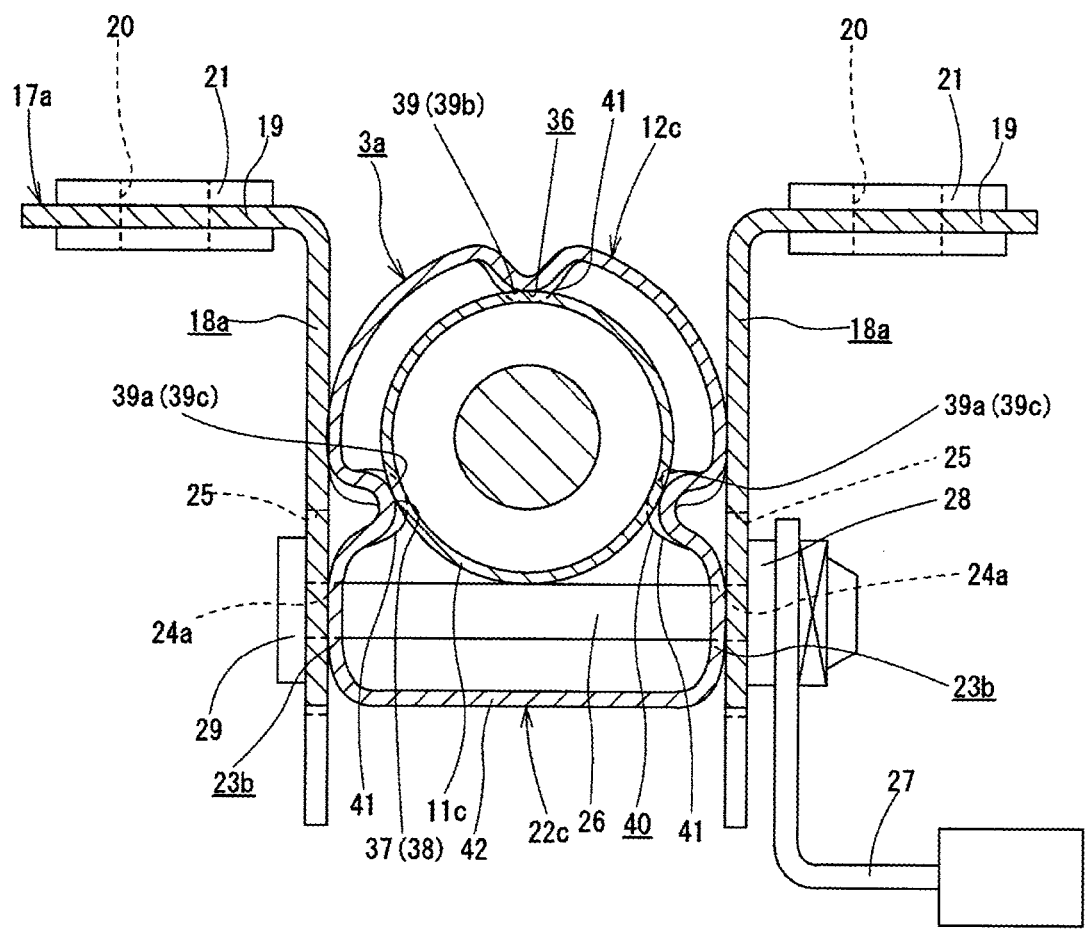
FIG. 3 is a sectional view of the telescopic steering apparatus, which is taken along a line III-III of FIG. 1.
Figure 4:
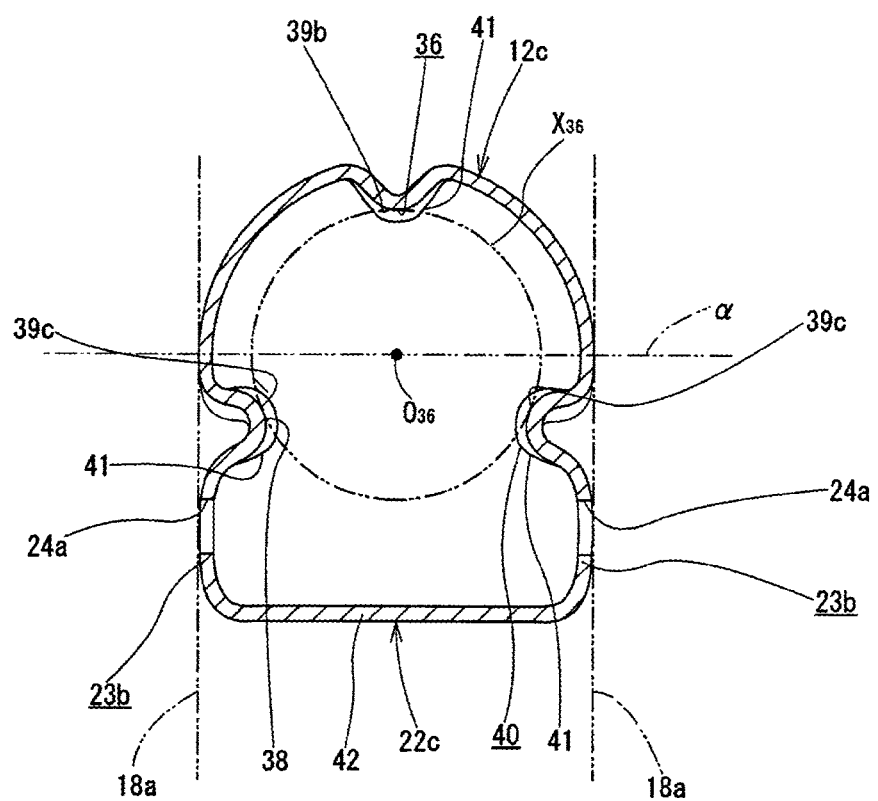
FIG. 4 is a sectional view of the outer column, which is taken along a line IV-IV of FIG. 2.

At the mounting state shown in FIG. 3, both sides in the width direction (the left-right direction in FIG. 3) of the outer peripheral surface of the outer column 12c are pressed to the inner side surfaces of the side wall portions 18a, 18a of the fixed bracket 17a. In this way, it is possible to position the steering column 3a and to secure the flexural stiffness in the width direction.

Figure 5:
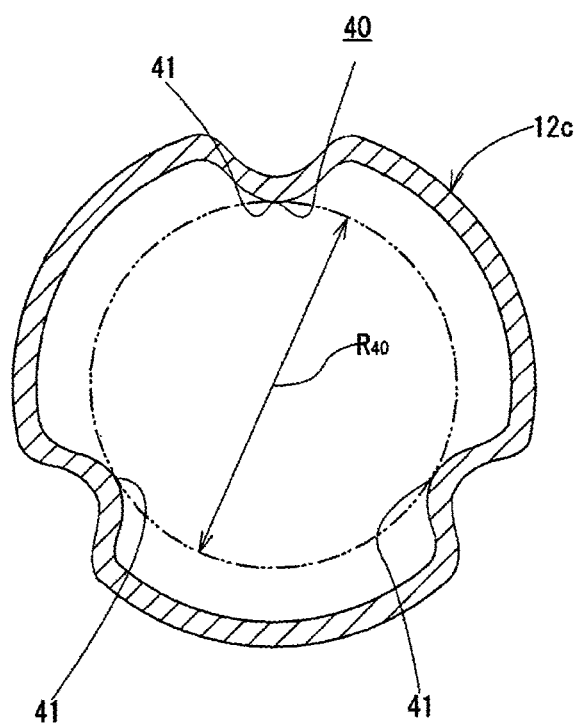
FIG. 5 is a sectional view of the outer column, which is taken along a line V-V of FIG. 2.

The inner peripheral surface of the outer column 12c is provided with a shock absorbing portion 40 at a location shifted toward one side (rear side) in the axial direction from an axial end face of the inner column 11c (an end face on an advancing side seen from the inner column 11c when the inner column 11c and the outer column 12c are relatively displaced in a compression direction, in the present example, the rear end face). As shown in FIG. 5, the shock absorbing portion 40 has protuberances 41, 41 that are formed to protrude radially inwards from the inner peripheral surface at positions circumferentially equally spaced on the inner peripheral surface of the outer column 12c. A diameter $R_{40}$ of an inscribed circle of the respective protuberances 41, 41 is smaller than an outer diameter of the inner column 11c. In this example, the respective protuberances 41, 41 of the shock absorbing portion 40 and the respective protuberances 39, 39a, 39b, 39c of the supporting portion 36 (the front and rear supporting portions 37, 38) are aligned in phase with respect to a circumferential direction.

The outer column 12c (including the supporting portion 36 and the shock absorbing portion 40) is formed by a hydroforming according to which a fluid pressure (e.g., a hydraulic pressure) is applied to an inner peripheral surface of a metal pipe, a hollow member made of a steel plate material or aluminum alloy material, to plastically deform the metal pipe radially outwards. In order to form the outer column 12c by the hydroforming, a metal pipe is set in a mold having an inner surface shape conforming to an outer surface shape of the outer column 12c that is to be formed by expanding a diameter thereof. Then, both ends of the metal pipe are blocked by a shaft pressing tool and the like and a high fluid pressure is applied into the metal pipe. By the applied fluid pressure, the metal pipe is expanded radially outwards until it firmly contacts an inner surface of a cavity of the mold, so that the outer column 12c is formed. Also, after the forming by the hydroforming, the finishing processing by the cutting work or press is performed for distal ends of the respective protuberances 39, 39a (39b, 39c) of the supporting portion 36 (the front and rear supporting portions 37, 38), as required. The method of forming the outer column 12c is not limited to the hydroforming, and a press working, a bulge forming, a vacuum forming, an air-blow forming, an explosive forming and the like are also possible.

The movable bracket 22c is integrally formed with the outer column 12c by a hydroforming and has a pair of clamped portions 23b, 23b and a bottom part 42, the clamped portions 23b, 23b being held by the side wall portions 18a, 18a of the fixed bracket 17a and are displaceable toward and away from each other in the width direction. The method for forming the movable bracket 22c is not limited to the hydroforming, and may be a press working, a bulge forming, a vacuum forming, an air-blow forming, an explosive forming and the like.

The clamped portions 23b, 23b are formed in parallel with each other in a state in which respective one ends thereof are continuous to lower ends of the protuberances 39a, 39c formed at the lower of FIG. 3 of the respective protuberances 39, 39a, 39b, 39c of the supporting portion 36 (the front and rear supporting portions 37, 38) of the outer column 12c. The column side through-holes 24a, 24a elongated in the axial direction are formed through the clamped portions 23b, 23b respectively at locations aligned with each other. The column side through-holes 24a, 24a can be also formed by the hydroforming (see, e.g., Patent Document 5).

The bottom part 42 continuously connects lower ends of the clamped portions 23b, 23b in the width direction (the left-right direction in FIG. 3). The method for integrally forming the movable bracket 22c and the outer column 12c is also not limited to the hydroforming, and may be a press working, a bulge forming, a vacuum forming, an air-blow forming, an explosive forming and the like.

As described above, according to the telescopic steering apparatus of this embodiment, it is possible to implement the structure capable of stably maintaining the inner column 11c radially inside the outer column 12c and absorbing a shock load upon a secondary collision at low cost. First, the reason to implement the structure capable of stably maintaining the inner column 11c radially inside the outer column 12c at low cost is because the outer column 12c including the supporting portion 36 (the front and rear supporting portions 37, 38) for supporting the inner column 11c and the movable bracket 22c are integrally formed by the hydroforming. That is, even with the structure where the supporting portion 36 (the front and rear supporting portions 37, 38) is configured by the multiple (for example, three or more) respective protuberances 39, 39a, 39b, 39c, it is possible to reduce the processing cost and to obtain the supporting portion having the high stiffness.

The reason why the structure capable of absorbing the shock load upon secondary collision can be implemented at low cost is because the inner peripheral surface of the outer column 12c is provided with the shock absorbing portion 40, the diameter of the inscribed circle of which is smaller than the outer diameter of the inner column 11c, at a location shifted toward one side in the axial direction from the axial end face of the inner column 11c, and the shock absorbing portion 40 is formed simultaneously with the respective protuberances 39, 39a, 39b, 39c by the expansion forming such as the hydroforming, for example. Upon the secondary collision, the inner column 11c and the outer column 12c are relatively displaced in the direction in which the steering column 3a is compressed (see FIG. 1B) such that the axial end face (rear end) of the inner column 11c frictionally moves along the shock absorbing portion 40 of the outer column 12c. The shock absorbing portion 40 functions as a resistance against the relative displacement of the inner column 11c and the outer column 12c and thus absorbs the shock energy applied to the steering wheel upon the secondary collision. Since the shock absorbing portion 40 is directly formed at the outer column 12c, it is not necessary to provide a separate shock absorption member. As a result, it is possible to reduce the processing cost, the component management cost and the assembling cost.

The supporting portion 36 (the front and rear supporting portions 37, 38) provided on the inner peripheral surface of the outer column 12c and the outer peripheral surface of the inner column 11c overlapping the supporting portion 36 contact each other at three locations along the circumferential direction. Therefore, the respective protuberances 39, 39b reliably contact the outer peripheral surface of the inner column 11c without increasing the processing accuracy of the respective protuberances 39, 39b of the supporting portion 36.

Figure 14:
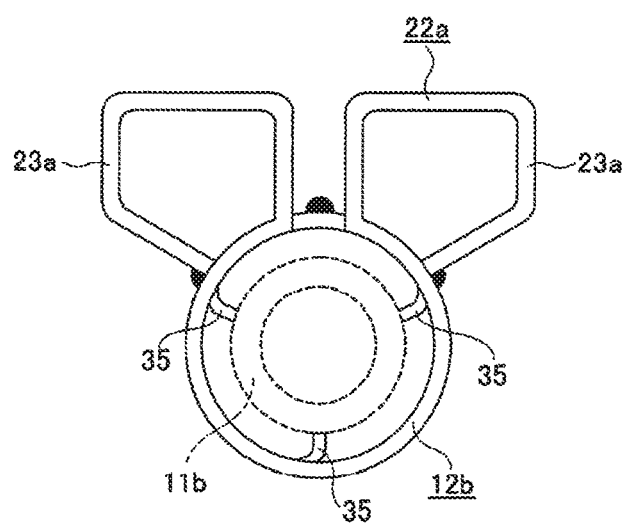
FIG. 14 is a sectional view of a telescopic steering apparatus according to a third conventional example.

When sufficient processing accuracy of the supporting portion 36 (the front and rear supporting portions 37, 38) cannot be obtained only with the hydroforming, the finishing processing by cutting work or press is performed for the distal ends of the respective protuberances 39, 39a, 39b, 39c of the supporting portion 36. Even when the finishing processing is performed, since only the three protuberances 39, 39a, 39b, 39c are provided, it is sufficient to make the diameter of the inscribed circle of the protuberances 39, 39a, 39b, 39c at the three positions be the same in the axial direction. Therefore, the finishing processing by cutting work or press is not troublesome and the inner column 11c can be stably supported by the supporting portion 36 (the front and rear supporting portions 37, 38). The respective protuberances 39, 39a, 39b, 39c of the supporting portion 36 (the front and rear supporting portions 37, 38) are formed to have the mountain-like shape by the hydroforming. Therefore, compared to the structure of the related art shown in FIG. 14, it is possible to increase the stiffness for supporting the inner column 11c. The other structures and operations are the same as the steering apparatus of the related art as described above.

Figure 6:
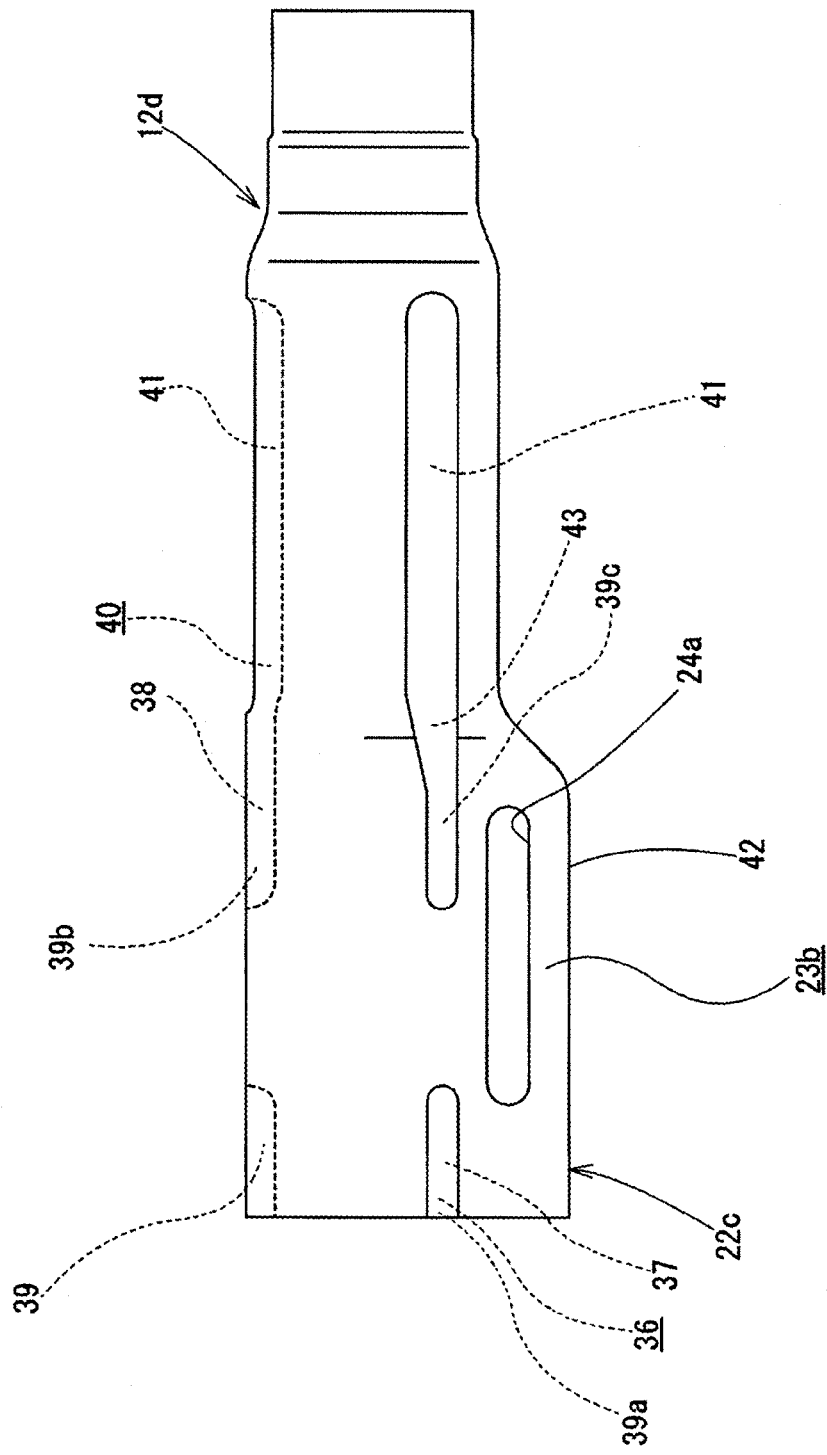
FIG. 6 is a side view of an outer column according to a second embodiment of the invention.

FIG. 6 shows an outer column 12d of a telescopic steering apparatus according to a second embodiment of the invention. Like the first embodiment, the respective protuberances 39, 39a, 39b, 39c of the supporting portion 36 (the front and rear supporting portions 37, 38) of the outer column 12d and the protuberances 41, 41 of the shock absorbing portion 40 are aligned in phase with respect to the circumferential direction. The axial rear ends of the respective protuberances 39b, 39c of the rear supporting portion 38 and the axial front ends of the protuberances 41, 41 of the shock absorbing portion 40 are smoothly continued by continuing parts 43, 43. According to the above telescopic steering apparatus, upon secondary collision, the inner column 11c (see FIGS. 1 and 3) and the outer column 12d can be smoothly and stably compressed. As a result, it is possible to stably absorb the shock load upon the secondary collision. The other structures, operations and effects are similar to those of the first embodiment.

Figure 7:
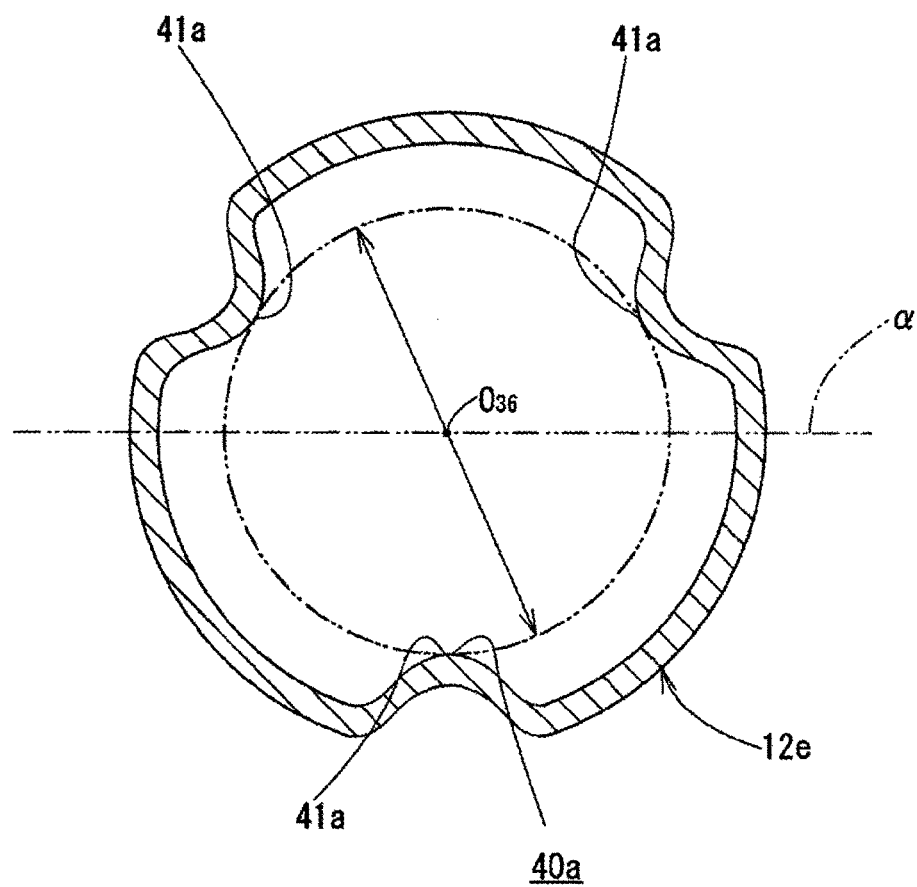
FIG. 7 is a side view of an outer column according to a third embodiment of the invention.

FIG. 7 shows an outer column 12e of a telescopic steering apparatus according to a third embodiment of the invention. The respective protuberances 39, 39a, 39b, 39c of the supporting portion 36 (the front and rear supporting portions 37, 38) of the outer column 12e are provided in a similar manner as in the above embodiment (see FIGS. 1 to 4). Respective protuberances 41a, 41a of a shock absorbing portion 40a are provided at locations (the upper and lower locations are opposite to the above embodiment) that are symmetric to the supporting portion 36 (the front and rear supporting portions 37, 38) with respect to a virtual plane α passing through a central axis $O_{36}$ of an inscribed circle X36 (see FIG. 4) of the supporting portion 36 and perpendicular to the side wall portions 18a, 18a of the fixed bracket 17a.

According to the telescopic steering apparatus, it is possible to increase the contacting locations along the circumferential direction (in the present example, six locations) between the respective protuberances 39, 39b of the supporting portion 36 (the front and rear supporting portions 37, 38) and respective protuberances 41a, 41a of the shock absorbing portion 40a and the outer peripheral surface of the inner column 11c, when the inner column 11c (see FIGS. 1 and 3) and the outer column 12e are compressed and thus the end face of the inner column 11c frictionally moves the respective protuberances 41a, 41a of the shock absorbing portion 40a (in a state in which the shock load is absorbed). As a result, it is possible to further sufficiently suppress the relative inclination of the inner column 11c and the outer column 12e, based on the load of the complex directions applied to the inner column 11c and the outer column 12e. The other structures, operations and effects are similar to those of the above embodiments.

Figure 8:
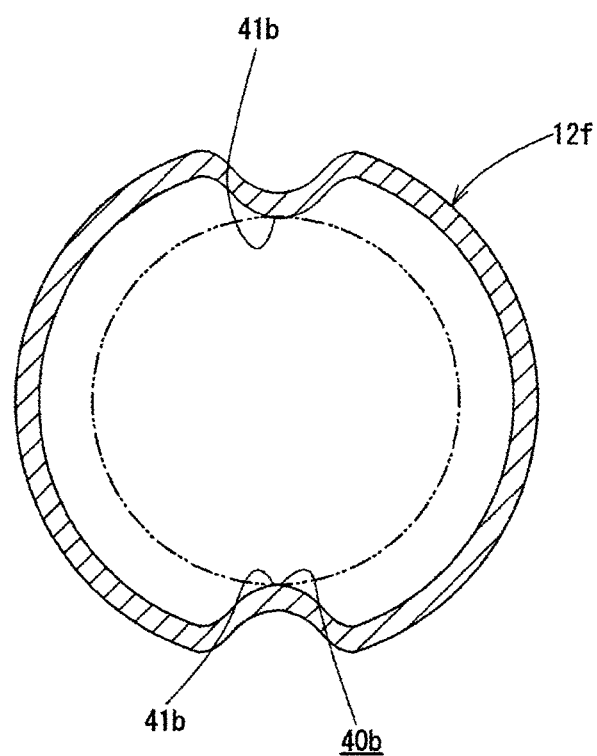
FIG. 8 is a side view of an outer column according to a fourth embodiment of the invention.

FIG. 8 shows an outer column 12f of a telescopic steering apparatus according to a fourth embodiment of the invention. The respective protuberances 39, 39b of the supporting portion 36 (the front and rear supporting portions 37, 38) of the outer column 12f are provided in a similar manner as in the fourth embodiment (see FIGS. 1 to 4). Respective protuberances 41b, 41b forming a shock absorbing portion 40b are provided at two positions circumferentially equally spaced on an inner peripheral surface of the outer column 12f (in the present example, at upper and lower ends in a state mouthed on the vehicle).

According to the telescopic steering apparatus, the number (two along the circumferential direction) of the respective protuberances 41b, 41b of the shock absorbing portion 40b is smaller than the above embodiments (three along the circumferential direction). Therefore, it is possible to reduce a resistance force when the inner column 11c (see FIGS. 1 and 3) and the outer column 12f are compressed and thus the end face of the inner column 11c frictionally moves along the respective protuberances 41b, 41b of the shock absorbing portion 40b. The other structures, operations and effects are similar to those of the above embodiments.

Figure 9:
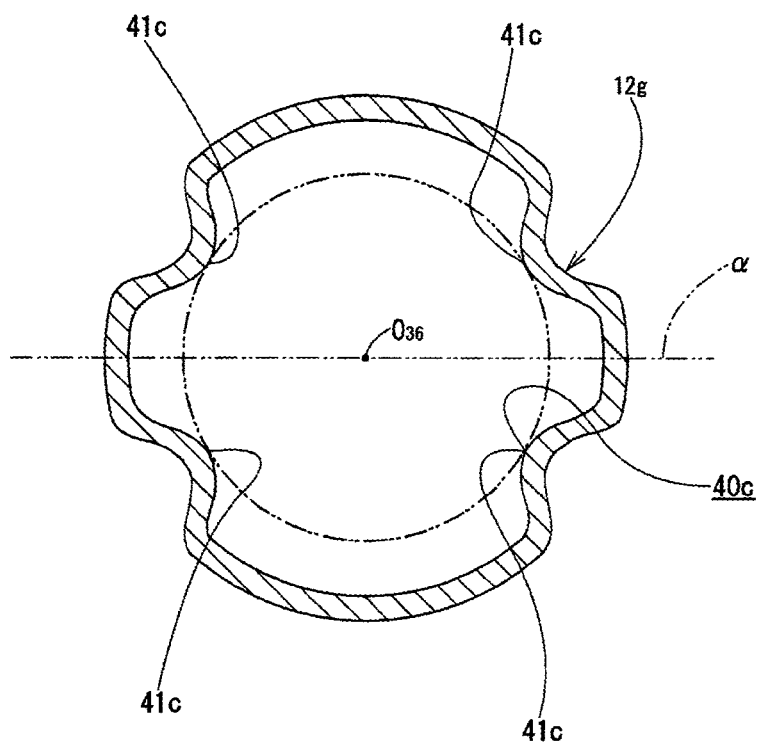
FIG. 9 is a side view of an outer column according to a fifth embodiment of the invention.

FIG. 9 shows an outer column 12g of a telescopic steering apparatus according to a fifth embodiment of the invention. The respective protuberances 39, 39a (39b, 39c) of the supporting portion 36 (the front and rear supporting portions 37, 38) of the outer column 12g are provided in a similar manner as in the first to third embodiments (see FIGS. 1 to 4). Respective protuberances 41c, 41c of a shock absorbing portion 40c are provided at four locations along the circumferential direction on an inner peripheral surface of the outer column 12g (at positions that are inclined by about 30° in the upper-lower direction relative to the virtual plane α passing through the central axis $O_{36}$ of the inscribed circle X36 (see FIG. 4) of the supporting portion 36 (the front and rear supporting portions 37, 38) and perpendicular to the side wall portions 18a, 18a of the fixed bracket 17a (see FIGS. 3 and 4).

According to the above telescopic steering apparatus, the number (four along the circumferential direction) of the respective protuberances 41c, 41c of the shock absorbing portion 40c is larger than the above embodiments (three along the circumferential direction). Therefore, it is possible to increase a resistance force when the inner column 11c (see FIGS. 1 and 3) and the outer column 12g are compressed and thus the end surface of the inner column 11c frictionally moves along the respective protuberances 41c, 41c of the shock absorbing portion 40c.

It is possible to increase the contacting locations along the circumferential direction (in the present example, seven locations in the circumferential direction) between the respective protuberances 39, 39a, 39b, 39c of the supporting portion 36 (the front and rear supporting portions 37, 38) and respective protuberances 41c, 41c of the shock absorbing portion 40c and the outer peripheral surface of the inner column 11c, when the inner column 11c and the outer column 12g are compressed and thus the end face of the inner column 11c frictionally moves along the respective protuberances 41c, 41c of the shock absorbing portion 40c (in a state in which the shock load is absorbed). As a result, it is possible to prevent the relative inclination of the inner column 11c and the outer column 12g, based on the load of the complex directions applied to the inner column 11c and the outer column 12g, thereby stably absorbing the shock. The other structures, operations and effects are similar to those of the first to third embodiments.

Figure 10:
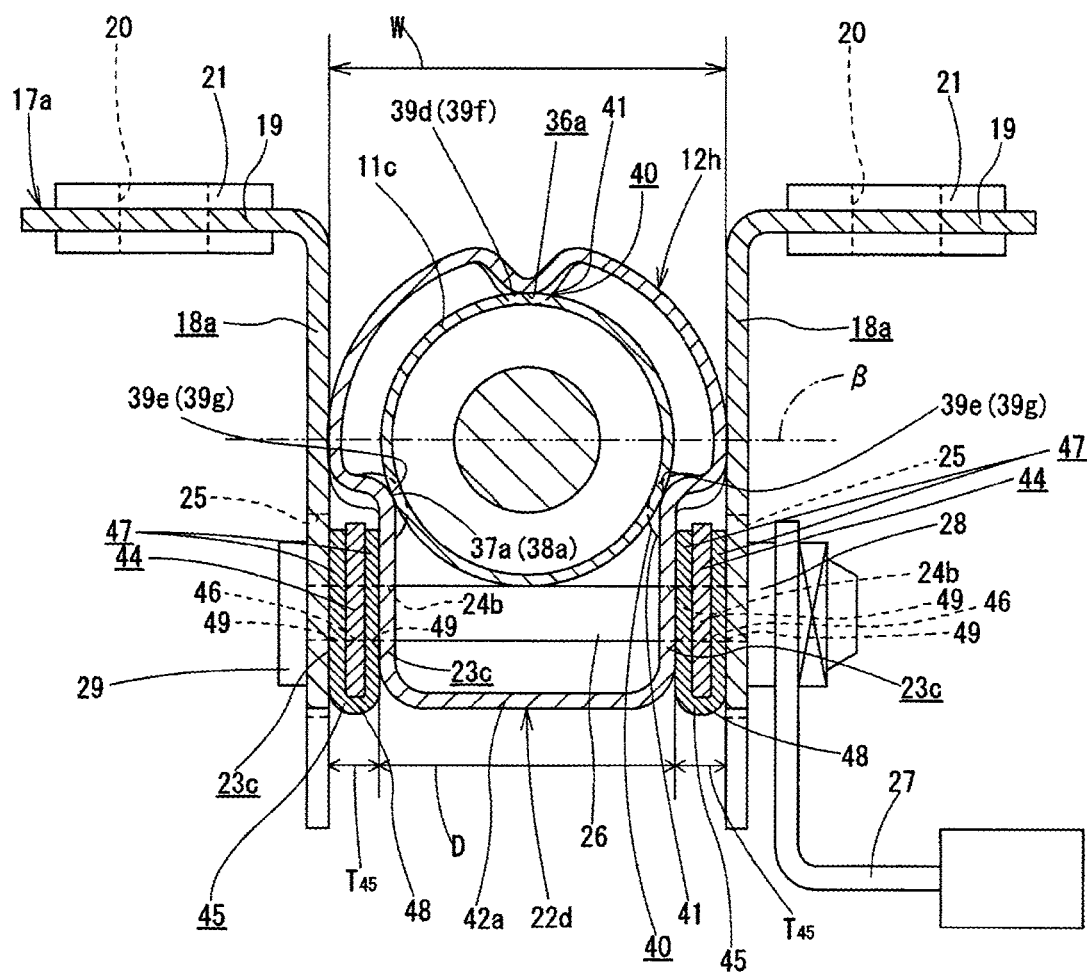
FIG. 10 is a side view of an outer column according to a sixth embodiment of the invention.

FIG. 10 shows a telescopic steering apparatus according to a sixth embodiment of the invention. The telescopic steering apparatus of this embodiment is different from the telescopic steering apparatus of the first embodiment, in that first and second frictional plates 44, 45, which will be described later, are provided and a structure of the movable bracket 22d is designed so as to provide the first and second frictional plates 44, 45. Therefore, the different structure is intensively described in the below. The structure of this embodiment can be implemented by a combination with the structures of the above embodiments.

Like the above embodiments, an outer column 12h forming the telescopic steering apparatus of this embodiment has a cylinder shape, an inner diameter of at least a portion in the axial direction is elastically enlargeable and reducible, and has a supporting portion 36a for fitting and supporting the inner column 11c radially inside the outer column 12h in an axially displaceable manner. The supporting portion 36a is configured by a front supporting portion 37a and a rear supporting portion 38a. The axial positions of the front supporting portion 37a and the rear supporting portion 38a are the same as the structure of the first embodiment.

Protuberances 39e, 39g formed at the lower of FIG. 9 of respective protuberances 39d, 39e, 39f, 39g of the front and rear supporting portions 37a, 38a and the outer peripheral surface of the inner column 11c contact each other at locations that are inclined by an angle θ (in the present example, 30°) towards the movable bracket 22d (towards the lower side in FIG. 10) with respect to a virtual plane β including a central axis $O_{11}$ of the inner column 11c and perpendicular to the side wall portions 18a, 18a of the fixed bracket 17a. When the angle θ is made to be larger (a size in the width direction between the protuberances 39e, 39e (39g, 39g) formed at the lower in FIG. 10 is made to be smaller), it is possible to increase the support stiffness of the outer column 12h in the upper-lower direction and to improve forming of the movable bracket 22d. However, when the angle θ is made to be excessively large, the support stiffness in the width direction is lowered. Hence, a magnitude of the angle θ is appropriately determined, considering the support stiffness required in the respective directions, thicknesses of first frictional plates 44, 44 and second frictional plates 45, 45, which will be described later, and the like.

In the present example, the movable bracket 22d has a pair of clamped portions 23c, 23c and a bottom part 42a connecting lower ends of the clamped portions 23c, 23c, the clamped portions 23c, 23c being provided to protrude downwards from the front end portion of the outer column 12h and held between the inner side surfaces of the side wall portions 18a, 18a as the gap between the inner side surfaces of the side wall portions 18a, 18a of the fixed bracket 17a is widened or narrowed. The clamped portions 23c, 23c are formed in parallel with each other in a state in which respective one ends thereof are continuous to the outer column 12h from lower ends of the protuberances 39e, 39e (39g, 39g) formed at the lower. Column side through-holes 24b, 24b elongated in the axial direction are formed through the clamped portions 23c, 23c respectively at location aligned with each other.

A size W in the width direction between the inner side surfaces of the side wall portions 18a, 18a of the fixed bracket 17a in the width direction is substantially the same as a sum of a length D between outer side surfaces of the clamped portions 23c, 23c in the width direction (the left-right direction in FIG. 9) and a summed thickness $2T_{45}$ of the first and second frictional plates 44, 45 (W≈D+$2T_{45}$). The first frictional plates 44, 44 and the second frictional plates 45, 45 are respectively arranged one by one between the inner side surfaces of the side wall portions 18a, 18a in the width direction and the outer side surfaces of the clamped portions 23c, 23c in the width direction.

Each of the first frictional plates 44, 44 is a plate-shaped member made of a lightweight alloy material such as an iron-based alloy, an aluminum-based alloy, a magnesium-based alloy and the like and is elongated in the front-rear direction. The first frictional plates 44, 44 are respectively formed with first frictional plate side through-holes 46 into which the rod member 26 can be inserted and which are elongated in the front-rear direction, at locations at which at least the column side through-holes 24b, 24b of the clamped portions 23c, 23c are aligned. A portion near the rear end and a portion near the front end of each of the first frictional plates 44, 44 are supported to the clamped portions 23c, 23c so that they can be only displaced in the width direction by a guide pin (not shown). That is, the respective first frictional plates 44, 44 are supported to the movable bracket 22d so that they can be moved in conjunction with the movable bracket 22d in the front-rear and upper-lower directions.

Each of the second frictional plates 45, 45 has a pair of frictional plate parts 47, 47, which are arranged in parallel with each other, and a continuing part 48 that continues lower end portions of the frictional plate parts 47, 47, and has a U-shaped sectional shape. Each of the second frictional plates 45, 45 is formed by bending a plate-shaped member made of a lightweight alloy material such as an iron-based alloy, an aluminum-based alloy, a magnesium-based alloy and the like. At portions of the frictional plate parts 47, 47 aligned with each other, a pair of second frictional plate side through-holes 49, 49 into which the rod member 26 can be inserted without play is formed. That is, in a state in which the rod member 26 is inserted into the second frictional plate side through-holes 49, 49, the respective second frictional plates 45, 45 can be moved in conjunction with the rod member 26 and the rod member 26 can be axially displaced.

The respective first frictional plates 44, 44 and the respective second frictional plates 45, 45 are arranged between the side wall portions 18a, 18a and the clamped portions 23c, 23c with the one first frictional plate 44, 44 being held between the frictional plate parts 47, 47 of the respective second frictional plates 45, 45 in a state in which the continuing part 48 of the one second frictional plate 45, 45 is faced downwards.

The outer column 12h and the respective first and second frictional plates 44, 45 of the telescopic steering apparatus of this embodiment are mounted as shown in FIG. 10. At the state where the respective members are assembled as shown in FIG. 10, when positioning the steering wheel 1 (see FIG. 11) in the front-rear direction, the adjusting lever 27 is rotated in a predetermined direction, like the structure of the related art as described above, thereby elastically widening the gap between the inner side surfaces of the side wall portions 18a, 18a. By doing so, the surface pressures at the respective contacting locations between the side wall portions 18a, 18a, the first frictional plates 44, 44, the second frictional plates 45, 45 and the clamped portions 23c, 23c are lowered or lost. Accompanied by this, the surface pressure of the fitting part between the supporting portion 36a (the front supporting portion 37a and the rear supporting portion 38a) of the outer column 12h and the outer peripheral surface of the inner column 11c is lowered or lost, so that the inner column 11c and the outer column 12h can be relatively displaced in the axial direction (the front-rear direction). As a result, it is possible to position the steering wheel 1 in the front-rear direction and the upper-lower direction.

After the positioning, when the adjusting lever 27 is rotated in the reverse direction to the predetermined direction, the gap between the inner side surfaces of the side wall portions 18a, 18a is narrowed and the surface pressures at the respective contacting locations between the side wall portions 18a, 18a, the first frictional plates 44, 44, the second frictional plates 45, 45 and the clamped portions 23c, 23c are increased. Accompanied by this, the surface pressure of the fitting part between the supporting portion 36a (the front supporting portion 37a and the rear supporting portion 38a) of the outer column 12h and the outer peripheral surface of the inner column 11c is increased. As a result, the steering wheel 1 is supported at an adjusted position. In the operation for supporting the steering wheel 1 at the adjusted position, in the addition to the clamped portions 23c, 23c being pressed by the inner side surfaces of the side wall portions 18a, 18a via the first and second frictional plates 44, 45, and end surfaces of the outer peripheral surface of the outer column 12h in the width direction may also be pressed by the inner side surfaces of the side wall portions 18a, 18a to enlarge or to reduce the inner diameter of the outer column 12h.

According to the telescopic steering apparatus of this embodiment, the first frictional plates 44, 44 and the second frictional plates 45, 45 are provided between the inner side surfaces of the side wall portions 18a, 18a and the clamped portions 23c, 23c. Therefore, it is possible to increase the frictional force by increasing a sum of the frictional areas of the respective contacting locations between the side wall portions 18a, 18a, the first frictional plates 44, 44, the second frictional plates 45, 45 and the clamped portions 23c, 23c. As a result, it is possible to stably support the steering wheel 1 at the adjusted position. The present embodiment can be combined with the above respective embodiments. The other structures, operations and effects are similar to those of the first embodiment.

The application is based on a Japanese Patent Application No. 2012-184113 filed on Aug. 23, 2012, the content of which is incorporated herein by reference.

INDUSTRIAL APPLICABILITY

The above embodiments have been described in connection with a steering apparatus including a telescopic mechanism configured to adjust a front-rear position of a steering wheel and a tilt mechanism configured to adjust an upper-lower position of the steering wheel. However, the present invention is also applicable to a steering apparatus having only the telescopic mechanism. Also, the positional relation of the outer column and inner column of the steering column in the front-rear direction is irrelevant. Contrary to the illustrated examples, the inner column may be provided on the rear side and the outer column may be provided on the front side.

DESCRIPTION OF REFERENCE NUMERALS AND SIGNS

1: Steering Wheel
2: Steering Shaft
3, 3a: Steering Column
11, 11a, 11b, 11c: Inner Column
12, 12a, 12b, 12c, 12d, 12e, 12f, 12g, 12h: Outer Column
14: Vehicle Body
17, 17a: Fixed Bracket
18, 18a: Side Wall Portion
22, 22a, 22c, 22d: Movable bracket
23, 23a, 23b, 23c: Clamped Portion
24, 24a, 24b: Column Side Through-Hole
25: Vehicle Body Side Through-Hole
26: Rod Member
27: Adjusting Lever
36, 36a: Supporting Portion
37, 37a: Front Supporting Portion
38, 38a: Rear Supporting Portion
30, 30a, 40b, 40c: Shock Absorbing Portion
41, 41a, 41b, 41c: Protuberance

The invention claimed is:

1. A telescopic steering apparatus comprising a telescopic steering column, a steering shaft, a fixed bracket configured to be fixed to a vehicle body, a movable bracket, a rod member, and an adjusting lever,
wherein the steering column comprises a cylindrical outer column, at least a portion of which in an axial direction having an enlargeable and reducible inner diameter, and a cylindrical inner column arranged radially inside the outer column, the outer column is movable with respect to the fixed bracket at a telescopic adjustment, and an inner peripheral surface of the outer column having a supporting portion to which the inner column is fitted and is arranged to support the inner column such that the inner column is axially displaceable,
wherein the steering shaft is rotatably supported radially inside the steering column, and has a rear end portion protruding rearward from a rear end opening of the steering column and configured such that a steering wheel is attached thereto,
wherein the fixed bracket includes a pair of side wall portions provided at a fixed part so as to hold the portion of the outer column having the enlargeable and reducible inner diameter from both sides in a width direction, the pair of side wall portions being displaceable toward and away from each other in the width direction,
wherein the moveable bracket has a pair of clamped portions formed integrally with the outer column by plastic forming, the pair of clamped portions being displaceable toward and way from each other in the width direction in accordance with a displacement of the pair of side wall portions toward and away from each other in the width direction,
wherein the rod member is arranged in the width direction such that the rod member is inserted into vehicle body side through-holes formed through the pair of side wall portions at locations aligned with each other and column side through-holes formed through the pair of clamped portions, and is configured to widen or to narrow a gap between a pair of surfaces of the pair of sided wall portions opposed to each other,
wherein the adjusting lever is provided at a base end portion of the rod member, and is configured to widen or to narrow the gap between the pair of surfaces by a rotation of the adjusting lever,
wherein the inner peripheral surface of the outer column has a shock absorbing portion at a location shifted toward a rear side in the axial direction from an axial rear end face of the inner column, a diameter of an inscribed circle of the shock absorbing portion being smaller than an outer diameter of the inner column,
wherein the outer column, including the supporting portion and the shock absorbing portion, is formed by expanding a hollow pipe radially outwards, and
wherein the movable bracket is formed integrally with the outer column by an expansion forming.

2. The telescopic steering apparatus according to claim 1, wherein the expansion forming is a hydroforming.

3. The telescopic steering apparatus according to claim 1, wherein the supporting portion of the outer column and the outer peripheral surface of the inner column contact each other at three or more locations along a circumferential direction.

4. The telescopic steering apparatus according to claim 1, wherein the supporting portion of the outer column and the outer peripheral surface of the inner column contact each other at only three locations along a circumferential direction.

5. The telescopic steering apparatus according to claim 1, wherein the supporting portion of the outer column is finished by a cutting or a pressing.

6. The telescopic steering apparatus according to claim 1, wherein the shock absorbing portion includes protuberances protruding radially inwards from the inner peripheral surface of the outer column at a plurality of locations along a circumferential direction on the inner peripheral surface of the outer column.

7. The telescopic steering apparatus according to claim 1, wherein the supporting portion and the shock absorbing portion are aligned in phase with respect to a circumferential direction.

8. The telescopic steering apparatus according to claim 7, wherein the supporting portion and the shock absorbing portion are provided continuously in the axial direction.

9. The telescopic steering apparatus according to claim 1, wherein the shock absorbing portion is provided at a location symmetric to the supporting portion with respect to a virtual plane including a central axis of an inscribed circle of the supporting portion and perpendicular to the pair of side wall portions of the fixed bracket.

* * * * *